United States Patent [19]
Eickmann

[11] Patent Number: 4,770,371
[45] Date of Patent: Sep. 13, 1988

[54] FLUID MOTOR DRIVEN MULTI PROPELLER AIRCRAFT

[76] Inventor: Karl Eickmann, 2420 Isshiki, Hayama-machi, Kanagawa-ken, Japan

[21] Appl. No.: 828,115

[22] Filed: Feb. 10, 1986

Related U.S. Application Data

[60] Division of Ser. No. 110,157, Jan. 7, 1980, and Ser. No. 91,651, Nov. 5, 1979, and a continuation-in-part of Ser. No. 533,073, Sep. 16, 1983, Ser. No. 308,202, Oct. 2, 1981, Ser. No. 483,977, Apr. 11, 1983, Ser. No. 621,819, Jun. 18, 1984, abandoned, Ser. No. 973,780, Dec. 27, 1928, abandoned, and Ser. No. 425,747, Sep. 28, 1982, said Ser. No. 621,819, is a division of Ser. No. 973,780, Dec. 27, 1978, which is a continuation-in-part of Ser. No. 760,006, Jan. 17, 1977, Pat. No. 4,136,845, which is a continuation-in-part of Ser. No. 487,272, Jul. 10, 1974, Pat. No. 4,009,847, which is a continuation-in-part of Ser. No. 104,676, Mar. 8, 1971, Pat. No. 3,823,898, said Ser. No. 91,651, is a division of Ser. No. 842,979, Oct. 13, 1977, which is a continuation of Ser. No. 610,871, Sep. 8, 1975, abandoned, which is a division of Ser. No. 416,237, Nov. 15, 1973, abandoned, which is a division of Ser. No. 131,782, Apr. 6, 1971, Pat. No. 3,790,105, which is a continuation-in-part of Ser. No. 782,349, Dec. 9, 1968, abandoned, which is a continuation-in-part of Ser. No. 328,395, Dec. 5, 1963, abandoned, and Ser. No. 551,023, May 18, 1966, abandoned, said Ser. No. 425,747, is a continuation-in-part of Ser. No. 973,780, , Ser. No. 760,006, , and Ser. No. 487,272.

[51] Int. Cl.⁴ .............................................. B64C 27/22
[52] U.S. Cl. ................... 244/17.23; 244/17.23; 244/39; 416/244 R
[58] Field of Search .................. 244/2, 6, 7 R, 7 A, 244/7 B, 17.11, 23 C, 12.2, 12.4, 39; 416/244 R, 142, 146 R, 93

[56] References Cited

U.S. PATENT DOCUMENTS

| | | | |
|---|---|---|---|
| 1,903,440 | 4/1933 | Cambridge | 244/6 |
| 2,081,210 | 5/1937 | Williams, Jr. | 416/93 |
| 2,083,064 | 6/1937 | Hess, Jr. | 244/6 |
| 2,278,247 | 3/1942 | Cullin | 416/93 |
| 2,306,096 | 12/1942 | Vose | 416/93 |
| 2,709,035 | 5/1955 | Schmidt | 416/93 |
| 2,823,875 | 2/1958 | Peterson | 244/7 A |
| 4,433,819 | 2/1984 | Carrington | 244/12.2 |

FOREIGN PATENT DOCUMENTS

| | | | |
|---|---|---|---|
| 230204 | 11/1963 | Austria | 244/23 C |
| 931266 | 8/1955 | Fed. Rep. of Germany | 244/7 A |
| 1226719 | 7/1960 | France | 244/7 R |
| 797019 | 6/1958 | United Kingdom | 244/7 R |
| 1,405,737 | 9/1975 | United Kingdom | 244/7 R |

OTHER PUBLICATIONS

Brownlow, "Spurs New CX-6A Interest" *Aviation Week*, Nov. 15, 1965 p. 91.

*Primary Examiner*—Galen Barefoot

[57] ABSTRACT

An aircraft has a plurality of pairs of disc-type wings behind each other kept by holding structures on the body of the craft. Each pair has one disc-type wing on the right and one disc type wing on the left of the body, symmetrically arranged relative to the body. The discs have propeller blades which can be retracted into the discs and be extended from the discs. The discs are also provided with windows wherein adjustable covers are located which can close and open the windows.

For forward flight the discs are slightly inclined to act as wings which carry the craft. For vertical take off and landing the propeller blades are extended from the discs while the discs are revolved for action of the propeller blades as lift providers for the craft. An analysis which is given in this specification shows that a considerable benefit is obtained at equal installation of power if at least two pairs of propeller revolving discs are provided on the aircraft.

7 Claims, 4 Drawing Sheets

FLUID MOTOR DRIVEN MULTI PROPELLER AIRCRAFT

REFERENCE TO RELATED APPLICATIONS

This is a continuation in part application of my co-pending application Ser. No. 06-621,819, filed on 06-18-84 as a divisional of application Ser. No. 05-973,780, filed on 12-27-78. This is also a continuation in part of my application Ser. No. 05-973,780, now under appeal, filed 12-27-78 as a continuation in part application of that time Ser. No. 760,006, now abandoned and which was filed on Jan. 17, 1977 as a continuation in part application of my still earlier patent application Ser. No. 487,272, filed on July 10, 1974 and resulted in U.S. Pat. No. 4,009,849 issued on Mar. 1, 1977. The mentioned application Ser. No. 487,272 was a continuation in part application of my still earlier patent application Ser. No. 104,676, which was filed on Mar. 8, 1971 and which is now U.S. Pat. No. 3,823,898; partial benefit of which is claimed herewith, while the other partial benefits of the mentioned earlier or co-pending application(s) are also claimed for the present application. Partially this present application is also a divisional application of my co-pending application, Ser. No. 110,157 which was filed on Jan. 7, 1980, because FIG. 10 of this application is taken from said co-pending application. Applications Ser. Nos. 06-621,819 and 05-973,780 are now abandoned. The application Ser. No. 760,006 is now U.S. Pat. No. 4,136,845 and priority of the Austrian application No. 2060/78 of Mar. 22, 1978 is also claimed for this present patent application.

This is also a divisional application of my co-pending application, Ser. No. 091,651, which was filed on Nov. 5, 1979 and which is now under appeal.

The mentioned application Ser. No. 091,651 is a divisional of my earlier patent application Ser. No. 842,979; filed on Oct. 13, 1977. Application Ser. No. 842,979 is a CFR 1.60 continuation application of application Ser. No. 610,871, filed on Sept. 8, 1975, which is now abandoned. Application Ser. No. 610,871 was a divisional patent application of my earlier patent application Ser. No. 416,237, filed on Nov. 15, 1973, now abandoned. Application Ser. No. 416,237 was a divisional application of my still earlier patent application Ser. No. 131,782 which was filed on Apr. 6, 1971 and which is now U.S. Pat. No. 3,790,105, which issued on Feb. 5, 1974. Application Ser. No. 131,782 was a continuation in part of the still earlier application Ser. No. 782,349 which was filed on Dec. 9, 1968 and which is now abandoned. Application Ser. No. 782,349 was a continuation in part application of the still earlier patent applications Ser. No. 328,395 of Dec. 5, 1963 and of Ser. No. 551,023 of May 18, 1966 which are now both abandoned, while the mentioned application Ser. No. 328,395 is now U.S. Pat. No. 3,320,898, which issued on May 23, 1967. This is also a continuation in part application of my co-pending application Ser. No. 425,747, filed on Sept. 28, 1982 as a continuation in part application of Ser. Nos. 973,780; 760,006 and 487,272 of 05. This is also a continuation in part application of my co-pending applications Ser. No. 308,202 which was filed on Oct. 2, 1981; of Ser. No. 483,977 which was filed on Apr. 11, 1983, of Ser. No. 425,747 which was filed on Sept. 28, 1982, of Ser. No. 533,073 which was filed on Sept. 16, 1983 and and of Ser. No. 483,977 which was filed on Apr. 11, 1983. These mentioned applications except Ser. No. 308,202 establish continuations or earlier applications whereof they are continuation applications.

Benefits of my above mentioned earlier applications are claimed herewith for this present application at least partially.

BACKGROUND OF THE INVENTION (a) Field of the Invention

This application relates to aircraft or vertically and horizontally flying aircraft, which are droven by propellers, which in turn are driven by hydraulic or other fluid motors. The invention relates further to such aircraft which have at least two pairs of tiltable or pivotable wings. In such craft each pair of wings consists of a left side and a right side wing portion. Each wing-portion has at least one propeller which is pivoted together with the wing. In substantial vertical propeller axes and wing-position, the craft can vertically or almost vertically take off and land. At substantially horizontal propeller axes and wing-position the aircraft can fly on wings forwardly. The heretofore known fields of inventions did however never propose an aircraft of the present type.

(b) Description of the Prior Art

Horizontally moving propeller driven vehicle or aircraft are derived partially from the applications whereof the present application is a respective continuation or divisional application. For example, they are shown in my U.S. Pat. Nos. 3,790,105; 3,823,898; 9,983,833 or 4,126,522. Other air-borne vehicles, for example those, where hydraulic fluid motors are driving propellers which may be fastened on pipes, are for example, my U.S. Pat. Nos. 3,211,399; 3,253,806, 3,345,016; 3,497,162 or 3,614,029. My newest aircraft U.S. Pat. No. 4,136,845 whereof the priority is claimed too, discloses retractable propellers in the wings. All these heretofore mentioned patents have hydraulic drives for the propellers.

Differently therefrom there have been attempts to develop vertically take of and landing aircraft with pivotable wings, wherein the propellers are driven by engines directly or by mechanical transmissions which are extended from the engine(s) in the body through the respective wing portion to the propellers.

VTOL=vertically taking off and landing aircraft, as far as the engines to drive the propellers are fastened to the respective wing or portion of the wing have been build and published reports about their capabilities exist. At least one type is build by a commercial aircraft company and the airforce has successfully build and let be published reports about heavy types of such propeller driven VTOL aircraft. The Jet-engine driven VTOL fighter planes are not related to the present invention, because they are not propeller-driven.

More closer related to the present invention, than the aircraft with engines mounted on the wings, are those, where one or more engine(s) is (are) mounted in the body of the aircraft and mechanic transmission means are extended from the respective engine in the body to the propeller(s) on the wings. The most closely related aircraft of the last mentioned types are for example shown in the following patents:

U.S. Pat. No. 3,181,810—OLSON, whereof also a Canadian patent exists, shows two pairs of wing portions which each have a propeller. Plural engines are mounted in the body and drive a transmission means in common, which is a mechanical transmission. The mechanic transmission extends from the engines through a portion of the body and through portions of the wings to the propellers to drive them. While the patent describes the arrangement in great detail, it also discloses, that a great number of parts are required, which together make a very heavy weight. The wings are needing additional structures and bearings must be provided for the propellers to hold them. The patent fails to give an overall weight-lift balance of the craft. It can not be seen, how much the craft would be able to lift after it has to carry all the many heavy parts of the transmission, wing structure and propeller shaft bearings.

U.S. Pat. No. 2,708,081—DOBSON shows an aircraft with each one wing portion extending to the right and left of the body. The wings are however borne on on pipes which are inside of each other and the drive shaft is full and inside of the inner pipe. The pipes, which bear the wings are borne in separated bearings on each side of the body of the craft. The there disclosed pipes must be either of big diameter to be able to carry the load of the wings and the thrusts of the propellers, which would require heavy weight of the pipes. Or there would have to be additional structures of heavy weight to make the wings stable. In addition the bearing capacity of the single bearings for each side wardly extending wing-pipe set can be only limited. The craft in addition needs still too many heavy parts to become economical and the patent fails also, in the same way, as Olson, to disclose an overall lift-weight balance.

Other former art exists in several patents, which show specific details, but which do not appear to be closely related to the present invention. Those are, for example;

U.S. Pat. No. 1,858,011, ZERBI discloses double-coaxial propeller drive means which are of mechanical nature.

U.S. Pat. No. 3,797,783—KISOVEC discloses propellers on the wing tips, which are mechanically driven and which can be pivoted from vertical to horizontal.

U.S. Pat. No. 3,514,052—Mc.KEOWN discloses pivotable propellers on fixed wings, namely on the tips of the wing portions.

U.S. Pat. No. 3,165,280—SHAO-TANG LEE discloses horizontally-vertically collapsible wing portions.

U.S. Pat. No. 2,988,152—Katzenberger discloses pipes in wings, which are exclusively laterally of each other and which lead compressed air or gases to the ports on the wings on the ends of the wings. There the ports are bend in a rearward direction to supply a forward thrust to the aircraft by the rearwards directed outflows of the air or gases.

GERMAN Pat. No. 1,299,535—HILLER also discloses pivotable wings, which carry propeller-driving engines.

U.S. Pat. No. 3,861,623—FRUECHTE discloses two propellers which are synchronised for their rotary speeds by a hydrostatic transmission means or synchronization means.

GERMAN Pat. No. 1,275,874—YOUNG again discloses propeller driving engines on the tips of pivotable wings.

However; all of the mentioned patents of the former art are failing to give an exactly examinable overall lift-weight balance.

They all, as far as they are for pivotable wings, are however demonstrarting the direction of the affords of the former art. They were exclusively directed to mechanical transmission means or to propeller-driving engines on the wings.

It is applicant's discovery by the present invention, that the devices of the former art are uneconomic for vertical take off aircraft for the average citizen with an average income and budget. The craft of the former art are too expensive in operation. Because their too heavy weight requires too expensive, strong engines of little weight. Because the required parts in the craft are too many and the sum of their weights is too heavy to permit an inexpensive engine of only limited horsepower with small fuel consumption.

SUMMARY OF THE INVENTION

The invention aims, to overcome the limitations and difficulties of the former art and to provide a very safe vertically taking off and landing, but horizontally flying aircraft for the average person or for economic use in industrial or higher capacity applications.

The invention discloses in great detail a preferred embodiment of the invention and in it the invention does away the many heavy parts of the former art. It applies only very reliable and simple means of little weight. In its aim to spare the heavy operation costs of the fuel consuming heavy weight machines of the former art, the invention starts off with a clear analysis of what is important for the vertical take off and landing and what applies at the later forward flight on the wings.

At common aircraft-technology it was assumed, that it would be the most economic way to drive a propeller by mounting the propeller directly onto a flange of a crankshaft of the aircraft engine. By setting the propeller directly onto the crankshaft of the engine losses of transmissions should be prevented. Because, when a transmission is used between an engine and a means driven by the engine, there will be losses in the transmission.

This assumption of the common aircraft technology, which makes at the first glimpse the impression of being absolutely true—simply because it is true that a transmission has losses—is however, as the inventor of this application found, under certain circumstances a disastrous error, which has considerably prevented the advancement of flight-technology.

Figure 1:
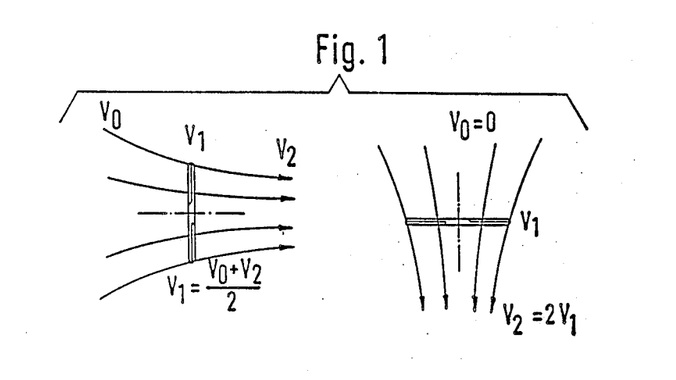
FIG. 1 shows the air stream through a propeller circle as it is known from the conventional air-stream theory; namely in one schematic at vertical hovering in the air and in the other diagram at foreward flight with the velocity "V0" as forward speed of the craft.

This will be visible at hand of FIG. 1 of this specification.

It is generally known from Newtons law of force, that the force equals the mass multiplied by the acceleration, according to equation: (1)

$$\text{Force} = \text{mass} \times \text{acceleration; or: } F_k = m \cdot a \quad (1)$$

The mass of air, which flows through the propeller circle of FIG. 1 is:

$$m = \rho \cdot F \cdot V_1 \quad (2)$$

And, since it is required to accellerate the mass of air, when it flows through the propeller circle from the velocity "V0"=zero to the final velocity "V2", the accelleration of the mass of air, when it flows through the propeller-circle is:

$$a = V_2/\text{second} \quad (3).$$

Consequently, the force obtained by Newton's $$F_k = \rho F V_1 V_2 / s \quad (4)$$

And, since it is known from the theorem of Freude, that the velocity through the propeller circle is the mean value of the velocities before and after the propeller circle, namely:

$$V_1 = (V_0 + V_2)/2 \quad (5)$$

the force, which is required to keep an airborne craft with vertical propeller axis (axes) in hovering without ascend and descent is:

$$F_k = \rho F V_1 V_2 = \rho F V_1 2 V_1 = \rho F 2 V_1^2 \quad (6)$$

Or, with I=impulse:

$$I = m 2 V_1 = 2\rho F V_1^2 = H = S \quad (7).$$

The kinetical energy in the air-stream behind the propeller is:

$$E_k = m/2(2V_1)^2 = 2\rho F V_1^3 = N \quad (8).$$

Equation (2) can be transformed to V1, to be:

$$V_1 = \sqrt[3]{N/2\rho F} \quad (9)$$

and the "V1" of equation (3) can be used to be inserted into equation (1), whereby the followings are obtained:

$$H = S = 2\rho F[\sqrt[3]{N/2\rho F}]^2 \quad (10)$$

or:

$$H = S = 2\rho F \sqrt[3]{N/2\rho F} \sqrt[3]{N/2\rho F}$$

or:

$$H^3 = S^3 = 8\rho^3 F^3 (N/2\rho F)(N/2\rho F)$$

or:

$$H^3 = S^3 = 8/4 \rho F N^2$$

or:

$$H = S = \sqrt[3]{2\rho F N^2} \quad (11)$$

or:

$$N = \sqrt{S^3/2\rho F} \quad (12).$$

In the above equations the following values may be used:
- $\rho$ = density of air (for example: in kg s$^2$/m$^4$)
- N = Power (for example in kgm/s)
- S = H = lift of thrust (for example; in Kg.)
- I = Impuls (for example in Kg.)
- V1 = velocity of the air in the propeller-circle (f.e. in m/s)
- m = mass of air in the flow (for example Kgmass = Kg/9,81)
- F = are of propeller-circle (for example in m$^2$.).

As a first step to explain my invention, I introduce "M" which shall define the number of propellers, which will be used in my craft. For comparison with conventional helicopters it should be understood, that equal diameters of propellers are considered. Also the forms, pitches, configurations and like shall be the same, when propellers are compared.

As second step I introduce the efficiency of a transmission and call it "$\eta$". The transmission may also be my hydraulic transmission of a plurality of separated flows of fluid of equal rate of flow in the flows.

I now introduce "$\eta$" and "M" into equation (11) whereby equation (11) transforms to:

$$H = S = M\sqrt[3]{2\rho F(\eta N/M)^2} \quad (13).$$

This equation (13) now shows already some very interesting surprises, which will be found to be important means of the present invention.

For example:

The equation explains, that the lift is as greater as the number "M" of the propellers is.

And, the equation has the further surprise, that the lift will not be reduced parallel to the losses in the transmission, but only with the third root of the second power of the efficiency-losses.

These features, which my equation explaines, are obtained at the given power. Or, in other words, my equation shows, that, when a certain power is available, the lift or ability to carry, of an airborne craft will increase, when the number "M" of the propellers is increased and when done so, the losses which may appear in a transmission which transfers the power to the plurality of propellers will not reduce the lift or carrying capacity in the same ratio as the losses reduce the power in the transmission, but less, namely only with the third root of the second power.

In short, my equation shows, that with increasing the number of the propellers, an increase of lifting capacity or of carrying power, can be obtained.

As a next step to explain my invention, I assume, that in equation (13) equal values will be used for a comparison of a conventional helicopter with a plural propeller craft of my invention. Equal values in equation (13) mean, equal power "N", equal values "2"; equal values of density "$\rho$" and equal values of propeller-dimensions, including equal values of cross-sectional areas "F" through the propeller-circles. For a comparison of flight-technology-systems the equal values can simply be left out of equation (13) and I so obtain my comparison equation (14) which shows my comparison-factor "Ftl"; namely:

$$F_{TL} = M\sqrt[3]{\eta^2/M^2} \text{ or: } F_{TL} = \sqrt[3]{M\eta^2} \quad (14).$$

With this equation it is possible to calculate a comparison diagram, wherefrom the comparison factor "Ftl" can immediately be seen and which shows, how many times lift a machine with a certain number of propellers and a certain transmission efficiency will give, compared to other or conventional craft. This diagram will be shown in FIG. 17.

The common helicopter has the Ftl value 1 minus the mechanic transmission losses and minus the power which is required to drive the tail rotor. In short, the common helicopter may have a Ftl value of 0.75 to 0.85.

DESCRIPION OF THE PREFERRED EMBODIMENTS

In FIG. 1 the air-stream through a propeller circle is shown, as known from the conventional air-stream theory. In one portion of the Figure for a vertical axis of the propeller for a vertical air-stream at hovering of the craft. In the other portion of the Figure for a propeller with horizontal axis and horizontal air-stream through the propeller circle as in forward flight. In the one portion of the Figure the forward velocity "V0" of the craft and thereby of the propeller is "zero" namely in the right portion of the Figure. But in the left portion of the Figure the forward velocity "V0" of the craft and thereby of the propeller is "V0".

Consequently, as known from the literature, the velocity through the propeller-circle is in the right part of the Figure=``V1'' which corresponds to ``V2/2'' when ``V2'' is the velocity of the air after the propeller. And in the left part of FIG. 1 the velocity of the air through the propeller circle is also ``V1'' but this ``V1'' corresponds now to: $V1=(V0+V2)/2$. Since these facts are generally known from the air-stream literatures, the FIG. 1 contains nothing new. It is however contained in this application in order to explain, that these facts are the bases of the mathematics and of the formulas. For example, the right part of FIG. 1 is the basis for the lift of propellers as defined in the equations (1) to (14) of this specification.

For the operation of my aircraft I prefer to locate the single power plant or a plurality of power plants in the body of the craft, hold the wing type discs by structures on the body of the craft, drive the revolvable discs by fluid motors which in turn are driven by fluid flows obtained from pump(s) driven by the power plant(s) and lead the fluid flows from the pump(s) through the structures to the fluid motors which revolve the mentioned discs.

If a plurality of power plants are provided in the craft, each of the power plants is preferred to provide by its pump(s) a number of flows of fluid equal to the number of discs provided on the raft. The flows from the same power plant's pump will have equal rate of flow in all flows. The flows from different sources of power should then become combined to a number of combined flows equal to the number of discs which are provided on the craft.

Figure 2:
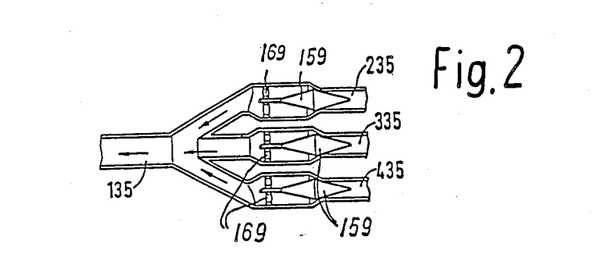
FIG. 2 shows a longitudinal sectional view through a flow combination valve-set, whereby multiple flows from different sources of power are combined to a single continuing combined flow.

FIG. 2 now illustrates how such individual flows from different power plants are combined to a single combined flow. One sees in the Figure the ingoing separate flows 235,335 and 435 which flow over one-way check valves 159 with guides 169 into the common outgoing combined flow 135. If four discs are provided and three independent power plants are used, four of such valve-arrangements of FIG. 2 will be used in the craft.

Figure 3:
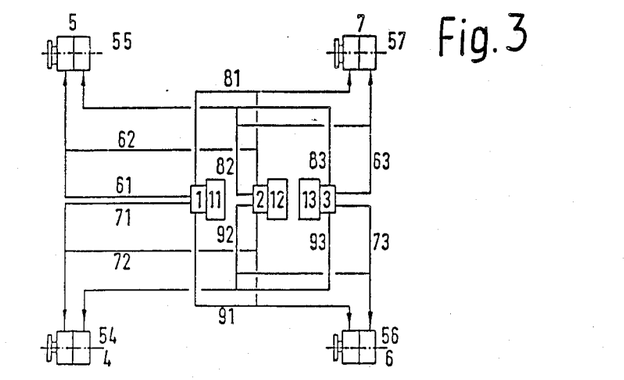

FIG. 3 illustrates in a schematic diagram the use of double motors as fluid motors to revolve the discs of the craft, while three independent power plants 11,12,13 drive three four flow pumps 1,2,3. The flows from pump 1 go through fluid lines 81,91,61,71 to motors 7,6,5 and 4, while the flows from pump 2 go through fluid lines 63,73,62,72 to motors 57,56,55 and 54, and the flows from pump 3 pass through fluid lines 83,93,63,73 to motors 55,54,57 and 56. Fluid motors 5 and 55 act onto a common shaft to drive one of the discs, motors 4,54 act again onto a common shaft to drive another of the discs, motors 6,56 act again onto a common shaft to drive still another disc and the motors 7 and 57 act also onto a common shaft to drive still a further disc of the revolvable discs of my aircraft.

Figure 4:
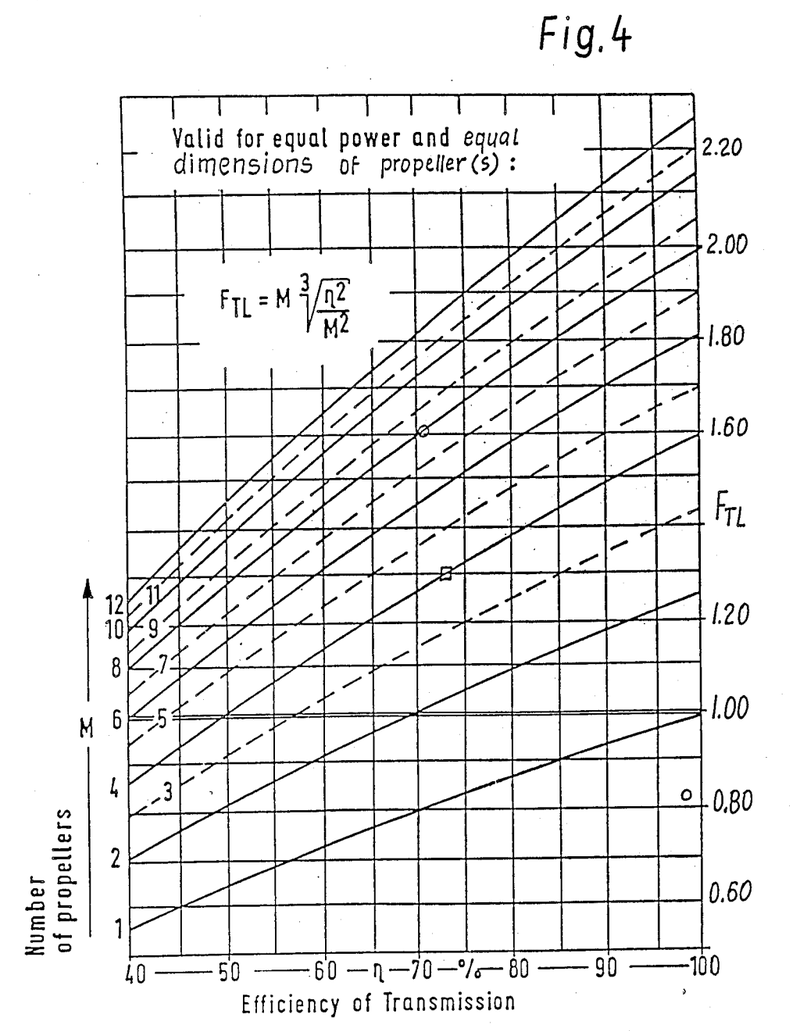
FIG. 4 is a schematic diagram which shows my lift factor "Ftl".

FIG. 4 shows my "Ftl" factor from my equations, illustrated in a neutral diagram. From this Figure it can directly be seen how much lifting capacity is obtained by using my system of plural propellers for lifting of the craft and this diagram includes the influence of losses in the transmission by the efficiency of the transmissions between the power plant and the propellers of the revolving discs.

FIG. 2 demonstrates by way of example such combination of a plurality of flows from different power sources to a single fluid motor. Fluid lines 235,335,435 may come from different pumps of different power plants 1,11 and 2,12 and 3,13. One way check-valves 159 may be provided in said fluid lines. Each one in a respective one of the fluid lines. The valves 159 may be streamlined and may be guided in guide means 169. After the valves 159—see the arrows to understand the meaning of "after",—the fluid lines combine to a single combined fluid line 135. This fluid line 135 goes therefrom to one of the motors 4,5,6 or 7. The pressure in the fluid line 135 presses the valves 159 to close towards the respective fluid line 235,335 or 435. When fluid flows in the fluid lines 235,335 or 435, the respective valve 159 is opened to let the flow flow from line 235 or 335 or 435 into the common combined fluid line 135.

But flow in the opposite direction, or back-flow, or flow contary to the direction of the arrows is prevented by the automatic closing of the respective valves 159.

When there are three power plants, each with a four-flow pump in the craft and when four propeller motors shall be driven by four such combined flows, there will be four such valve-sets as in FIG. 2. Thereby each of four combined fluid lines 135 will receive about one fourth of the power of each of the three power plants. The number of flows and of pumps and engines is by way of example. Any other desired number may be materialized in such one way check valve sets as in FIG. 2. Thus, each motor 4,5,6 and 7 will receive one combined flow 135 and thereby each of said motors will receive one fourth of the fluid supplied by the pumps and one fourth of the powers of each of the engines or power plants. The combination of several specific fluid lines from different engine-pump sets will not disturb the equalness of the rates of flow in the separated combined fluid lines 135, because the separated fluid lines 135 are not combined with each other. Care must however be taken, to connect the correct fluid lines. If wrong fluid lines are combined, the desired effect can not be obtained.

It may also be mentioned, that one should not assume, that when the air-space would be overfilled with aircraft of this invention, that that would result in many accidents. Accidents are actually not required. Accidents are an appearance of high-speed aircraft, which lack the ability to rest in the air and which lack the ability to land at places which are no airports. The craft of the invention can fly in series or lines as cars are doing on the road and the already mentioned automatic radar control devices can automatically prevent collusions in the air. The devices of my U.S. Pat. No. 3,801,046 can also automatically force craft of the invention to fly behind each other with any given slow or high speed. It can also brake them automatically down to low speed, rest or back-movement. These means are as accurately possible as in cars on the road but even more better because of the automatic control by U.S. Pat. No. 3,801,046 which is not yet routine on cars on highways. In fact, the further possibility to pass another craft on a higher or lower flight level adds further safety and the fact that a craft in air has less resistance than a car on the road would even save fuel, when an equal number of equal fast aircraft would fly in the air instead of cars running on the road. Those possibilities have been highly desired, but they were never obtained because the proposals of the past lacked the manoverability of the convertible craft and they failed to become airborne because of their too heavy weight or they were too uneconomic because of the need of high power gas-turbines which can not be afforded by the average budget of average citizen.

In FIG. 3 one of those schematic plans is demonstrated, which I prefer in the craft of FIGS. 6 to 9. Two power plants would be enough for the vertical take off and landing, but in this schematic three power plants 1,2,3 are provided. The third of them is there for the remote possibility, that one of the power plants would fail just during a vertical take off or landing. In horizontal flight a single power plant would be enough to be kept air-borne. In the Figure the return fluid lines are not shown in order to keep the Figure free from an overload of lines and in order to keep it by simplicity in a form for easier understanding.

One reason for the use of three engine-hydraulic power plants or two of them also is, that they are available in a suitable power range of 80 to 180 HP each in my research institute. Of these sizes two engines would be anough to operate a vertical start or landing; one engine set would be nough to remain airborne and the third set will be available at an engine failure at vertical flight. In practice all two sets or there sets are running together but with lower rates of power when lower power is required or satisfactory.

Figure 5:
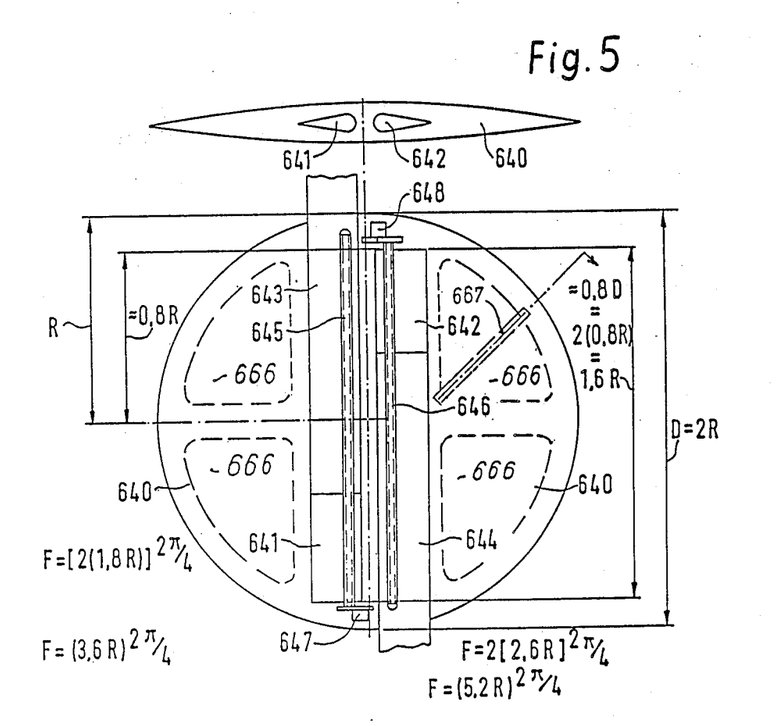
FIG. 5 illustrates a rotary disc-wing with retractable propellers with the top portion of the Figure showing it in a view from the side, while the bottom portion of the Figure shows it in a view from above.

FIG. 5 demonstrates in a schematic Figure a possibility of a retractable propeller. The disc- or discus-shaped body 640 is a rotary disc and contains propeller-arm receivable chambers 641 and 642. The propeller chambers 641 and 642 contain and guide at least partially the propeller-arms 643 and 644. The propeller blades 643 and 644 can be moved radially inwardly and outwardly in chambers and guide means 641 and 642. The body 640 is a disc, which is towards the outer portions thereof thinned, whereby it obtains a substantially symmetric streamlined configuration of a thicker medial portion and sharp and thin outer portions. The body 640 thereby constitutes a rotary or stationary circular wing. It may act as a wing, when it gets a certain angle of attack relatively to the air wherethrough it moves at substantially horizontal flight. It may however also serve as a propeller holder for vertical take off and landing. The system of FIG. 5 is one of those which are very easily controllable. The pilot may control a hydraulic valve-lever or a remote control thereof for actuating a pair of hydraulic pistons in hydraulic cylinders or a pair of rotary fluid motors 647,648 in one or the other rotary direction. Instead of hydraulic fluid motors, the motors of the motor pair 647,648 may also be air-motors, air-pistons and cylinders or electric or other linear or rotary motors. Preferred is however, that they be rotary motors with capability to revolve in both directions and with means to control the rotary motion in both directions by remote control from the cockpit and with the further condition, that the said motor revolve or act in unison, when one of the motors acts. Consequentely, the multiple separated parallel fluid flows of equal rate of flow as used in this invention, are very suitable to drive and control the actions of motors 647 and 648. A connection means, preferably spindles with threads, 645 and 646 are provided for the connection of each one of the motors 647,648 with one of the rotor blades 643,644. Transmissions may be provided between motors and connecters 645–646 if so desired.

Thus, an action in unison of motors 647,648 will move the propeller blades 643 and 644 with relatively to each other equal speed and with relatively to each other equal radial extension inward or outward in body 640. When that is done during revolving of the rotatable body 640, the propeller blade-extension acts as a propeller. The variability of the radial extension of the propeller-blades provides a propeller of variable propeller diameter and thereby of variable propeller-circle area "F" in line with the equations of this application. The rotary propeller disc with variable diameter of the propeller circle of FIG. 5 therefore is able to lift more at same installation of power to drive it with wide extended propeller-blades and it can transform into a disc-type wing with little resistance in air at high speed forward flight. The application of propeller-blades in a rotary disc with sharp outer edges is generally known from the literature and described in the literature. The hydraulic drive of the propeller blades in unison is however not known from the former art.

Another specifity of the rotary-propeller-carrying wing of FIG. 5 is also not known from the former art and is an object and a discovery of this present invention. That is the feature to provide the guide-chambers 641 and 642 not with only about the length of the radius of the disc through a half of the disc, but to extend the guide chambers 641 and 642 almost through the entire diameter of the disc-body 640. That is obtained by placing the guide chambers 641 and 642 not along an equal axis through the center of the disc-body 640 but to replace them parallel to each other away from the centre of the disc 640. Thereby each of the guide chambers 641 and 642 obtains a length almost equal to the length of the diameter of the disc. Such long guide chambers 641 and 642 of the invention can contain and facilitate the movement of propeller-blades of almost the length of the diameter of the disc. That makes the variable diameter propeller of big diameter and big area "F" of the propeller of FIG. 5 of the invention possible.

The Figure further demonstrates, that the propeller of the former art might have extended until maximally about 0.8 R=with R=radius of the disc=out of the disc 640. But due to the invention each propeller arm of the invention may be extended with two times of 0.8 R=1.6 R or 1.6 times of the radius of the discbody 640 out of the disc body 640. That gives by comparison a propeller circle area $F=((2(1.8\ R)))^2 pi/4=(3.6\ R)^2 pi/4$ of the former art and a propeller circle area "F" of the invention of: $F=((2(2.6\ R)))^2 pi/4=(5.2\ R)^2 pi/4$.

Thereby it is shown, that the variable propeller diameter rotary propeller carrying disc of FIG. 5 of the invention has a far greater lift and carrying capacity at vertical flight, vertical take off and landing as well as at hovering and at move.

The arrangement of the propeller-guide chambers and propeller blades in accordance with the rules of FIG. 5 is thereby an important improvement of propeller carrying disc shaped wings. The former art discus shaped propeller carrying wings could not succeed in practical application. They had too big diameters themselves and provided too small diameters of propeller circles for vertical flight, landing, take off, inclined move and for hovering.

The very considerable increase in propeller-circle area and also in lifting capacity will become aware by the calculation of the relation $(5.2)^2/(3.6)^2$ which gives 2.086. Therefrom follows, that the propeller-circle area of the invention of FIG. 5 is about 2.1 times bigger than that of respective devices of the former art. An increase of 2.1 times propeller circle area gives according to the equations and according to "Handbook of my Flight-Technology" a 1.28 times higher lifting capacity at the same power installation. At same time the relation of propeller-stream diameter to resistance diameter is better than in related devices of the former art.

Preferred is the operation of the driving motors 647 and 648 by fluid motors, which are set into fluid streams of equal rate of flow, like at the propeller drives of the application. Thereby not only a simple remote control from the cockpit can be obtained, but also a reliability of equal and to each other parallel outwards or inwards movemen of the propeller blades can be enforced and guaranteed.

An aircraft may be applied with one single propeller-carrying rotary disc wing of FIG. 5 or with a plurality of them. The discs themselfes may be driven to revolve by a respective fluid motor. When pluralities of propeller-carrying rotary wings are applied in an aircraft, they should be placed at pairs symmetrically of the body of the aircraft and the discs should be revolved by fluid motors, which are driven by separated flows of equal rate of flow, so, as other propellers of the present patent application are driven.

In the embodiment of FIGS. 6 to 9 the retractable propeller arms carrying rotary disc of FIG. 5 is used to mount at least two pairs of these discs at the right and the left of the body of the craft. The body 3313 has, as also all other bodies of aircraft of this application have, a medial vertical longitudinal plane 1313 which is an imagined plane to define the plane of symmetry of the body of the respective aircraft.

Figure 6:
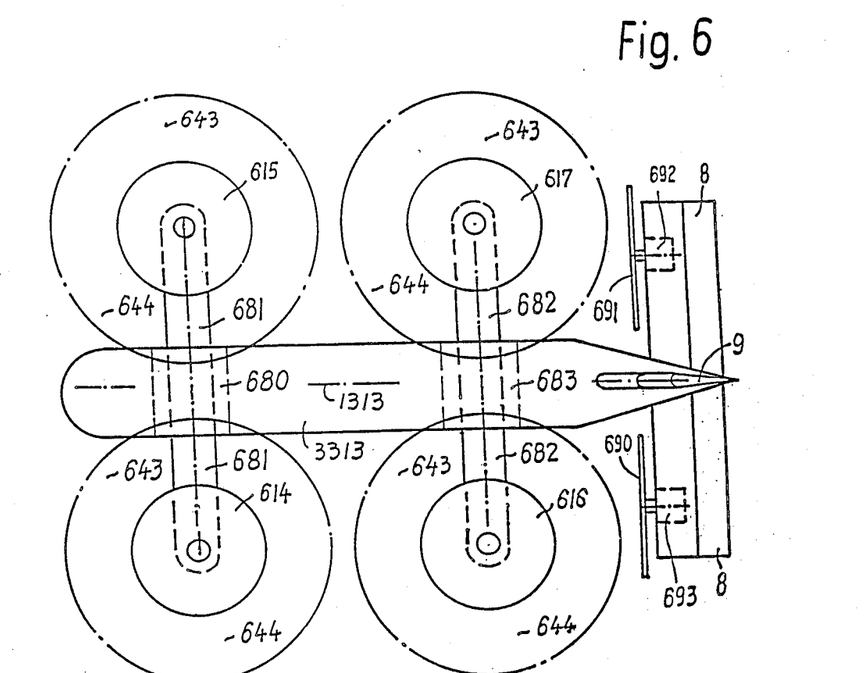
FIG. 6 shows an aircraft of the invention, seen from above.
Figure 7:
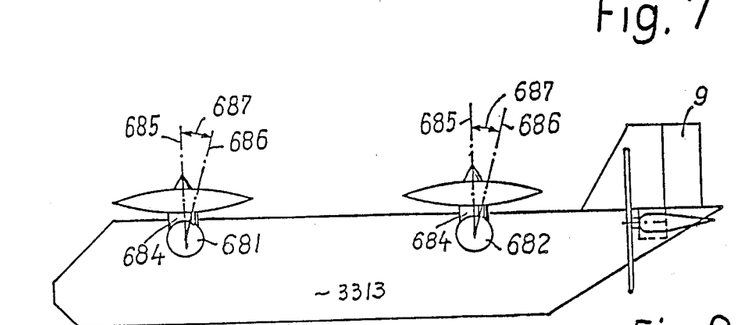
FIG. 7 shows the craft of FIG. 6 seen from the side.

The body 3313 of the craft is provided with two bearings 680,683 or at least one thereof to bear pivotably or fixed therein the holding spar(s) 681 or 681 and 682. The minimum of bearing(s) provided is one and there can be more than two, while the Figures show two bearings 680 and 683. The number of bearing spars, which may also be pipes or pipe structures, 681, 682, are at least one, but can be more, are two in the Figures and should be equal to the numbers of the bearings. Each bearing and spar carries on the ends of the respective spar rotary discs of FIG. 5 with retractable pairs of propeller arms therein. Thus, FIGS. 6 and 7 have one front pair 614,615 and one rear pair 616,617 of rotary discs with retractable propeller arms therein. Thus, the Figures show the sample of four rotary discs with propeller arms therein, which means four sets of discs similar to that of FIG. 5. Each pair of discs forms a right and a left disc with the left disc on the left side of the medial vertical longitudinal plane 1313 and one on the right thereof, whereby the two discs of a pair of discs are located symmetrically respective to the medial plane 1313. FIG. 6 shows the craft from above with the propeller arms extended out of the discs and revolving, whereby they are unvisible due to their rotary speed but whereby they show with their outer ends the four propeller circles 643,644 with the propeller arms 643 and 644 of FIG. 5. Each one propeller circle around the respective rotary disc 614,615,616 or 617. The craft may also have the forward driving propellers 690,691 which may be driven, for example, by the hydraulic motors or fluid motors 692 and 693 respectively. The craft also has side rudders 9 and elevators 8. The provision of the plurality of rotary discs with retractable propellers therein gives an extremity of lift for vertical take off and landing as well as hovering to the craft in accordance with the calculations of this present patent application.

For forward flight, the propellers may become retracted into the rotary discs as known from FIG. 5. The craft may then be driven forward by the forward drive propellers 690,691. Parallel to the gradual retraction of the propellers 643,644 into the rotary discs 614 to 617 the forward thrusts of the forward drive propellers 690,691 may be increased and the angle of attack of the rotary discs 614 to 617 may gradually, parallel to the increase of forward speed and retraction of propellers 643,644 be inclined (pivoted) from their axes directions 685 by a respective angle 687 to the forward flight axis direction 686. See hereto FIG. 7. At the angle 686 of the axes, the rotary discs act as wings of the craft, and their rotation may gradually be stopped. The aircraft can then fly forwards on the discs 614 to 617 regardless, whether additional wings are applied and regardless, whether the discs 643,644 revolve, revolve with subtracted or partially or entirely extended propeller arms, or revolving not, with stationar discs 614 to 617. For vertical landing or hovering the procedure may become reversed by gradually extending the propeller arms 643,644, revolving the discs 634 to 617, stopping the forward drive propellers 690,691, declining the angles of the axes of the rotary discs from axis position 686 to 685, and, thereafter, to gradually slow the speed of the rotary discs 614 to 617 down for the vertical landing.

The bearing spars 681 or 681 and 682 etc., may also be fixed in the bearings 680,683 of the body of the craft, if the costs for the pivotable arrangement of the spars in the bearings shall be saved. The Figures give only the principle of the embodiment. For its modifications and detailed designs I might be contacted in my research laboratory.

Figure 8:
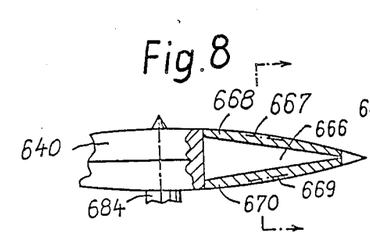
FIG. 8 shows a sectional view along the arrowed line of FIG. 5.
Figure 9:
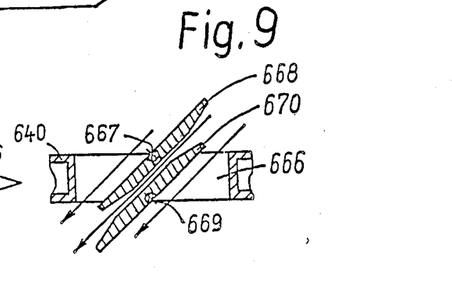
FIG. 9 shows the sectional view through FIG. 8 along the arrowed line of FIG. 8.

FIG. 8 demonstrates in FIGS. 8 and 9 a sample of the arrangement of the windows 666 in the rotary disc. FIG. 8 is thereby a sectional view through FIG. 5, taken along the arrowed line in FIG. 5. FIG. 9 is a sectional view along the arrowed line of FIG. 8.

The Figures thereby show not only the provision of the windows 666 of the rotary disc of FIG. 5, but also the closing covers 668 and 669 for temporary opening and closing the windows 666 of the rotary disc of FIG. 5.

FIG. 8 shows the window covers 668 and 669 in the closing position at which the covers close the window 666 in order to form a completely closed rotary disc without windows. This position is especially suitable for forwards flight when the disc shall act as a wing. FIG. 9 shows the window covers 668 and 670 in the opened position, at which they are swung around the swing centers 667,669 to an angle of attack of the covers which help to create lift at vertical flight or hovering, for example, by sucking air along the arrows of FIG. 9 through the window 666. The resistance of the closed disc of FIG. 5 at vertical air flow for vertical flight or hovering is thereby reduced, because the windows 666 are open now and permit the air stream of FIG. 1 to flow partially through the rotary disc of FIG. 5. Additionally thereto, however, the inclination of the window covers, one thereof on the bottom and the other thereof on the top of the window 666, may help to create an additional lift by letting the window covers 668,670 act as propellers would act, namely to tract air along the arrows of FIG. 9. The discs 614 to 617 may also be exclusively stationary to let the craft fly on them as wings if the rear propellers 690,691 are used to drive the craft. For revolving the discs 614 to 617 the respective drive means might be set through the holding spars 681,682. To fly on discs is not as effective as to fly on wings, but one can use the stationary discs for take off from a runway and provide the drive means later when the craft shall be used with propeller arms carrying rotary discs for vertical flight.

What is claimed is:

1. An aircraft, comprising, in combination, a body symmetrically built about a medial vertical plane, elevators, side rudders, a revolvable disc which is provided with arms of propellers which are borne by said disc, at least one propeller with a substantially horizontal axis, a power plant and a transmission for the transfer of power from said power plant to at least said one propeller,
   wherein an improvement is provided and includes, in combination,
   (1) a substantially vertical axis of said revolvable disc, around which said revolvable disc is revolvable,
   (2) said revolvable disc provided with reception compartments which are located excentrically offset from said vertical axis to extend at a length in said disc which exceeds the length of the radius of said disc, and wherein said compartments are provided with guides for therein receivable portions of at least two arms of propeller with said compartment and arms extending substantially in a plane which is normal respective to said axis of said disc,
   (3) said arms extendable and retractable relative to the axis of said disc to create a lift when said disc revolves and said arms are extended at least partially radially outwardly from said disc,
   (4) control means provided to control said radial extension and retraction of said arms relative to said disc,
   (5) Power inlets provided to said at least one propeller and to said disc, individually,
   (6) a power outlet provided on said power plant,
   (7) transmission inlets provided on said transmission and connected to said outlet, while individual transmission outlets are provided on said transmission and individually connected to the respective power inlets of said at least one propeller and of said disc, and;
   (8) power division and power division control means for the division of the total of the power output of said power plant into individual variable portions of power between said power plant, said at least one propeller and said disc.

2. The aircraft of claim 1,
   wherein said transmission is a fluid power transmission and includes at least one pump and two fluid motors with one of said fluid motors connected to the axis of said disc to revolve said disc while the another of said motors is connected to said at least one propeller with said substantial horizontal axis to drive the revolution of said propeller,
   wherein said pump is an at least partially variable pump and has at least two fluid line outlets with at least one of said fluid lines subjected to a vraiable fluid power delivery quantity of said the respective variable portion of said pump, and,
   wherein a controller is provided to said pump for the control of the quantity of delivery fluid from the respective outlet,
   whereby said controller defines the rates of powers of said total power of said power plant with an ability to revolve said disc and said propeller in unison, alternatively solely said disc and alternatively solely said propeller with said substantially horizontal axis.

3. The craft of claim 1,
   wherein two pairs of said discs are provided with a front pair on the front portion of said body and a rear pair on a more rear portion of said body,
   wherein the two discs of each pair are provided in opposed lateral directions relative to said body with one disc of a pair on the left- and the other disc of a pair on the right-side of said body,
   wherein said transmission is provided with four power outlets which are individually connected to said discs of said pairs of discs, and;
   wherein said transmission includes power-portion equalization means to revolve said discs of said pairs with equal rotary velocity.

4. The craft of claim 3,
   wherein said transmission includes a variable transmission portion and a controller to vary the portions of power which flow-through said transmission, and,
   wherein said controller subjects said portions of said power to revolve said pairs of discs and said propeller with said substantial horizontal axis in unison, alternatively said propeller exclusively with said total power and alternatively said discs exclusively without said propeller.

5. The craft of claim 3,
   wherein said discs are provided with windows located laterally of said reception compartments and inwards of the radial outer periphery of said discs with said discs extending from the upper top of said discs through said discs to end in the bottom portions of said discs, thereby forming upper and bottom window ports,
   wherein covers are provided to said ports with cover-movement control means for the alternative opening and closing of said windows by said overs, and,
   wherein aircraft attitude control means are provided to open said windows by removal of said covers from said windows effected by said cover movement control means at times when said discs are subjected to revolution and thereby to carry said craft, while said attitude control means are also provided to close said windows by reversing said cover-movement controller for times of foreward flight of said aircraft when it is forwardly driven by said propeller with said substantially horizontal axis and whereat said discs then act as wings to carry said craft.

6. The craft of claim 3, wherein said pairs of discs with their extended arms of propellers are located fully laterally of said body with the rear pair distanced from the front pair of said pairs of discs, whereby the lifting capacity of said craft at a given total of power of said power plant is at hovering 1.59 times increased over a craft with equal power, a single disc of said discs and equal dimensions of said disc, discs and arms of propellers.

7. The craft of claim 1, wherein said disc is provided with windows located laterally of said reception compartments and radially inwards of the radial outer periphery of said disc with said outer periphery closing said windows in radial outer direction relative to said disc, wherein top and bottom airfoil sectionally formed swingable bodies are provided individually in said windows, wherein said bodies are provided with medially located bearing bars which extend radially in opposite radial directions from said bodies to be borne in bearing portions in said discs, while they are pivotable around said axes, and, wherein said bodies are pivotably provided with a range of pivotal movement from a direction parallel to the top and bottom faces of said disc, respectively, thereby variably located in the directions of said top and bottom faces, and an inclined direction with an inclination relative to said top and bottom faces, whereby said bodies open said windows at times of their inclined directions to form wing type sections for the guidance of downwash air through said window, thereby forming wing portions in said windows for the creation of lift in said windows, wile said bodies form portions of said top and bottom faces of said disc when said bodies are set into their top- and bottom-faces parallel directions.

* * * * *